ID)
UNITED STATES PATENT OFFICE.

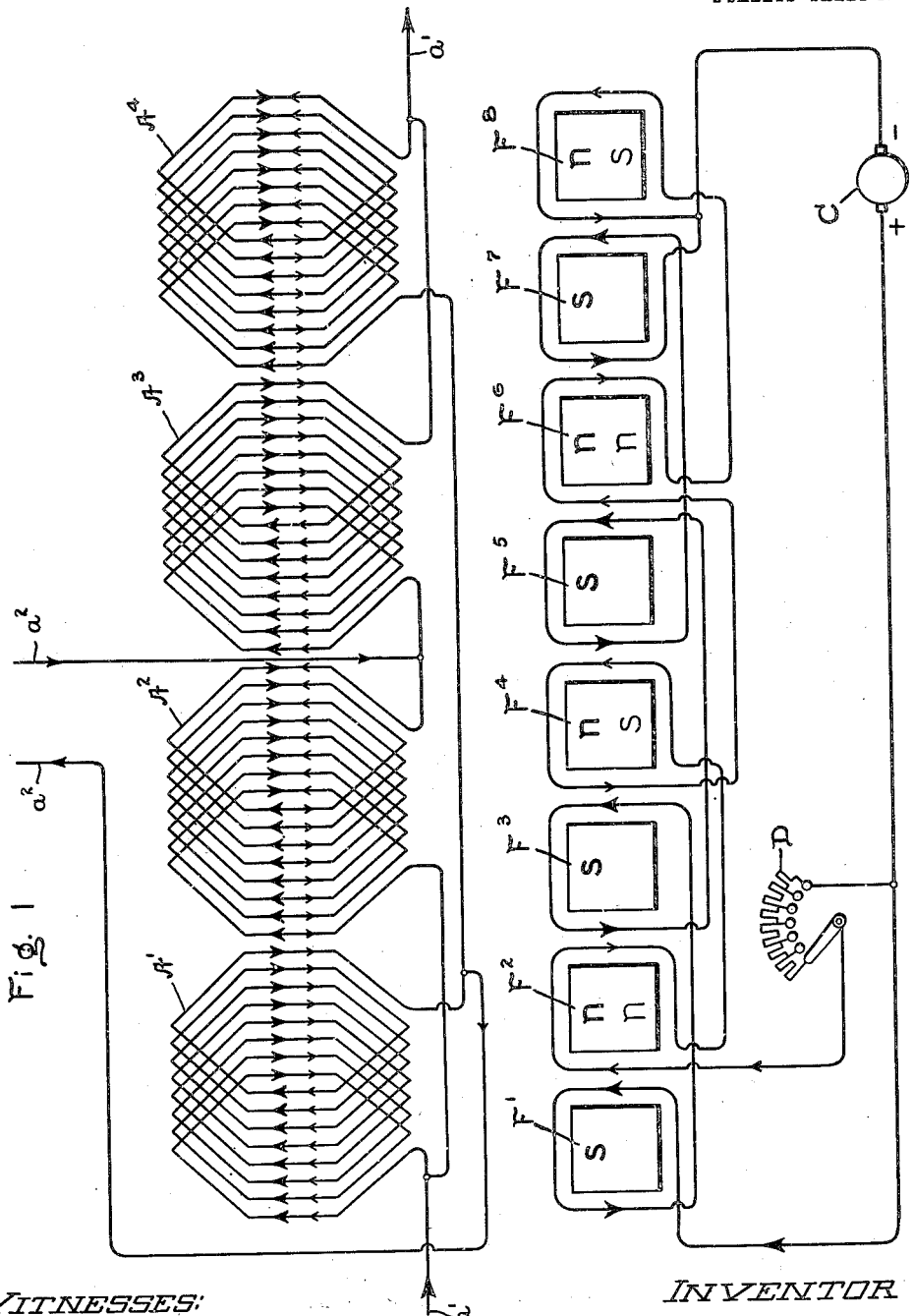

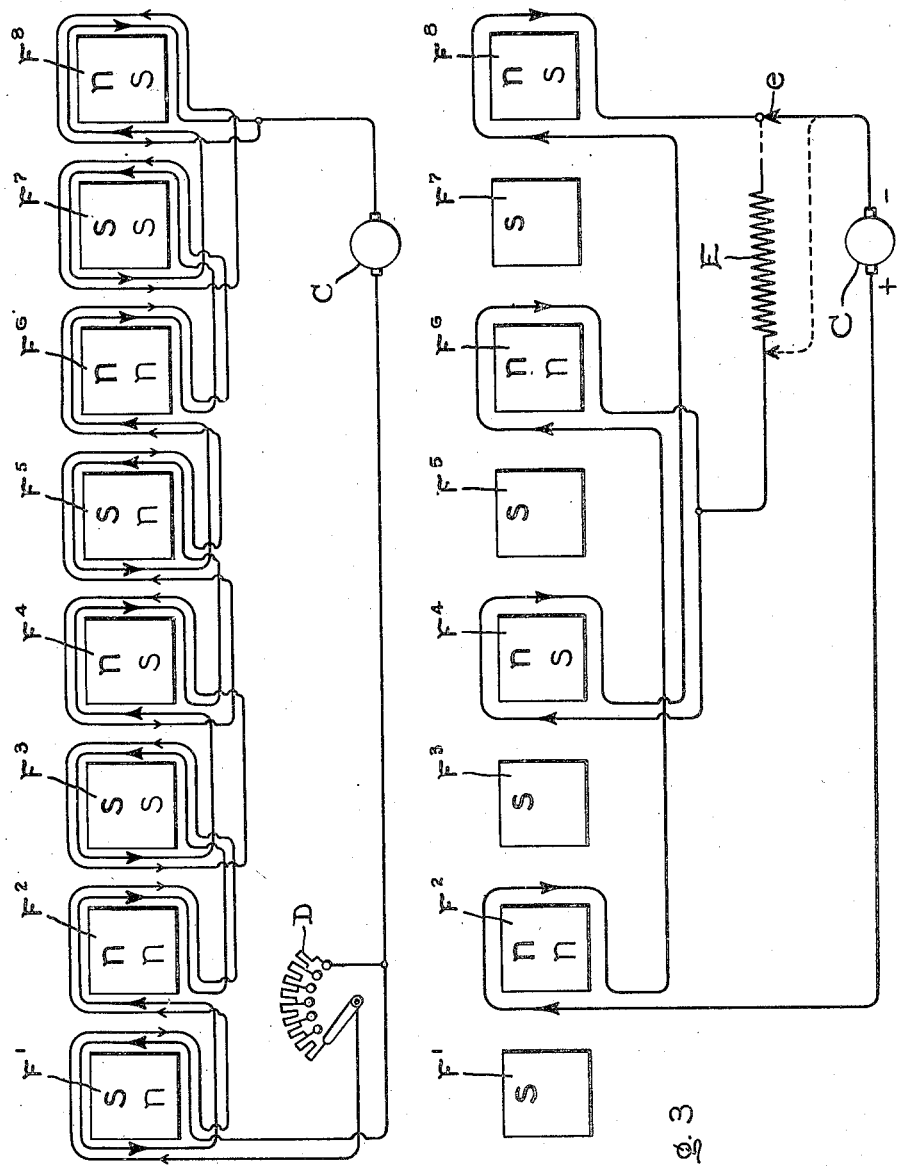

LAURENCE A. HAWKINS, OF SCHENECTADY, NEW YORK, ASSIGNOR TO GENERAL ELECTRIC COMPANY, A CORPORATION OF NEW YORK.

SYNCHRONOUS MACHINE.

952,113.  Specification of Letters Patent.  Patented Mar. 15, 1910.

Application filed August 5, 1909.  Serial No. 511,324.

*To all whom it may concern:*

Be it known that I, LAURENCE A. HAWKINS, a citizen of the United States, residing at Schenectady, in the county of Schenectady and State of New York, have invented certain new and useful Improvements in Synchronous Machines, of which the following is a specification.

My invention relates to synchronous alternating current machines and its object is to devise a novel machine of this type, adapted for use either as a double current generator or as a frequency changer, in which the two voltages may be independently varied.

In accordance with my invention, the machine has only a single armature and single field magnet. The field coils which mechanically form only a single winding are electrically connected in a plurality of circuits so as to produce two component magneto-motive forces of different pole numbers, the relative strengths of which may be varied by varying the relative currents in the circuits in which the field coils are connected. The coils of the armature winding also are preferably arranged to form mechanically only a single winding, but are connected in a plurality of circuits so as to form electrically two windings of different pole numbers corresponding to the pole numbers of the magneto-motive forces produced in the field magnet. If the pole numbers are so chosen as to be non-inductive with respect to each other, each component magneto-motive force of the field magnet induces a voltage in its own armature winding, and does not affect the other armature winding. By varying the relative strengths of the two magneto-motive forces, the relative amounts of the induced armature voltages are varied. Thus the machine may be operated as a frequency changer with a constant voltage on the motor side, while the voltage on the generator side is varied through any desired range, or, if the machine is operated as a double current generator, the voltage of both currents delivered may be varied, the variation of each being independent of the other.

While the armature coils are preferably arranged to form mechanically a single winding, my invention in its broader aspect is not limited to this arrangement of armature winding.

My invention will best be understood by reference to the accompanying drawings, in which—

Figure 1 shows diagrammatically a machine arranged in accordance with my invention, both field and armature being shown as developed on a plane surface, and Figs. 2 and 3 show modifications of the arrangement of field winding.

In Fig. 1, $A^1$, $A^2$, $A^3$ and $A^4$ represent armature coils or groups of armature coils. I have indicated only a single-phase winding, but it will be understood that my invention is applicable to a machine having any number of phases. $a'$ $a'$ represent the terminals of one armature circuit. It will be seen that this circuit extends through the four groups of coils in two parallel circuits, one comprising the coil groups $A'$ and $A^4$ and the other the coil groups $A^2$ and $A^3$. If the momentary direction of the current at the terminals is as indicated by the arrow heads, the current directions in the coil conductors will be as indicated by the heavy or upper arrow heads applied to the coils. It will further be seen, from this current distribution, that the armature winding, so far as this circuit is concerned, is an eight-pole winding. $a^2$ $a^2$ represent the terminals of the second armature circuit. One of these terminals is connected to the junction between the coil groups $A^2$ and $A^3$ and the other terminal to the junction of coils $A^1$ and $A^4$. That is, these terminals $a^2$ $a^2$ are at equipotential points with respect to the eight-pole circuit having the terminals $a'$ $a'$. This second circuit, of which the terminals are represented at $a^2$ $a^2$, is a parallel circuit in the armature winding, the coil groups $A^1$ and $A^2$ forming one path and $A^3$ and $A^4$ the other. If the momentary direction of current at terminals $a^2$ is as represented by the arrow heads, the current in the armature coils for this circuit will be as indicated by the light or lower arrow heads. It will be seen from the current distribution that so far as this circuit is concerned, the armature winding is a four-pole winding with coils of half pitch. The field magnet is provided with eight poles $F^1$ to $F^8$. The alternate poles $F^1$, $F^3$, etc. have their coils connected in series across the terminals of an exciter C. These coils are connected so as to make these alternate poles all of the same polarity, as indicated by the letters $s$ applied to them.

The intermediate poles $F^2$, $F^4$, etc. consequently have an opposite polarity due to these coils, as represented by the letters $n$ in heavy lines. The coils which are thus connected directly across the terminals of the exciter consequently produce an eight-pole magneto-motive force in the field magnet which acts upon the armature circuit, whose terminals are at $a^1$ $a^1$ and has no effect on the other armature circuit, since the voltages induced in each of its parallel parts by this eight-pole magnetization have a resultant value of zero. On the other poles $F^2$, $F^4$, etc. are placed a second series of coils which are connected to the exciter C through a rheostat D. As long as no current is flowing through this second set of field coils, no voltage is induced at the armature terminals $a^2$. When, however, current is supplied to these coils, a second magneto-motive force is produced in the field magnet having the polarities indicated by the letters $n$ $s$ in light lines. It will be seen that this magneto-motive force is four-polar and strengthens the eight-polar magnetization in poles $F^2$ and $F^6$, while weakening it in alternate poles of the same polarity, that is, in poles $F^4$ and $F^8$. The other poles $F^1$, $F^3$, etc., are unaffected. The four-polar magnetization induces a voltage in the armature circuit having its terminals at $a^2$ $a^2$ and the amount of this voltage may be varied by means of the rheostat D without affecting the voltage induced in the armature circuit having its terminals at $a^1$ $a^1$.

It will be seen that only half of the polar projections of the field magnet are used for the four-pole magnetization in Fig. 1. This means that the armature copper is not utilized so effectively for the four-pole circuit as for the eight. By the arrangement of Fig. 2 all of the polar projections of the field magnet are used for the four-pole magnetization, as well as for the eight-pole. In this figure each circuit includes part of the coil of each field pole, the relative connections of the coils being as shown. The eight-pole magnetization is the same as in Fig. 1, but for the four-pole magnetization two field poles $F^1$, $F^2$, for instance, constitute a single magnetic pole. As in Fig. 1, the voltage induced in one armature circuit may be varied by means of the rheostat D without varying the voltage induced in the other armature circuit. The arrangement of Fig. 2 as compared with that of Fig. 1 utilizes the armature copper to better advantage, but does not utilize the field copper so efficiently. For instance, the currents in the two halves of the coils on certain poles, as $F^1$, $F^4$, $F^5$ and $F^8$ are in opposition with respect to their magneto-motive forces, and therefore there exists at these poles an unnecessary C2R loss.

Still other arrangements of the field coils may be employed; for instance, in Fig. 3 only every other pole is wound, all the field copper being concentrated on the four poles $F^2$ $F^4$ $F^6$ and $F^8$. E represents a resistance adapted to be connected in shunt to a portion of the field coils. As long as the resistance E is open circuited, there exists only an eight-pole magnetization, but when, however, the circuit of the resistance is closed as indicated in dotted lines and the contact $e$ moved toward its dotted line position so as gradually to short circuit the resistance E, the current in field poles $F^2$ and $F^6$ is increased so as to strengthen these poles as indicated by the letters $n$ in light lines, while the current in poles $F^4$ and $F^8$ is decreased so as to weaken their magnetization as indicated by the letters $s$ in light lines. When the contact $e$ has reached the dotted line position no current is flowing through the coils $F^4$ and $F^8$ while the current in the coils on the poles $F^2$ and $F^6$ has been doubled. There are then, in effect, only two active field coils, but these are so placed as to give the equivalent of eight-polar and four-polar magneto-motive forces existing simultaneously and inducing voltage in both armature circuits.

Other arrangements of field coils may be employed, and also other arrangements of armature coils than that shown. It is only necessary, if the mechanically single armature winding is employed for both circuits, that the coils be so connected that the two circuits shall be mutually non-inductive.

It should be noted that if the smaller number of poles were made less than four, the machine would be magnetically unbalanced and strains would be produced in the shaft. For this reason the numbers of poles should not be less than eight and four, though they may be as much greater as desired.

I do not desire to limit myself to the arrangements and connections of parts shown and described, but aim, in the appended claims, to cover all modifications which are within the scope of my invention.

What I claim as new and desire to secure by Letters Patent of the United States, is,

1. A synchronous alternating-current machine, having a single armature and a single field magnet, each having coils forming mechanically a single winding but connected in a plurality of circuits and thereby forming electrically two windings of different pole numbers, and means for supplying to two circuits of the field magnet currents relatively variable in amount to induce relatively variable voltages in two armature circuits respectively.

2. A synchronous alternating current machine having a single armature and a single field magnet, said armature having coils forming mechanically a single winding but connected in a plurality of circuits and thereby forming electrically two windings of different pole members and said field magnet having coils and connections for producing in said magnet simultaneously two component magneto-motive forces corresponding in pole number to the two pole numbers of the armature winding, and means for varying the relative strengths of said magneto-motive forces to vary the relative amounts of the voltages induced in the armature circuits.

3. A synchronous alternating current machine having a single armature and a single field magnet, said armature having coils forming mechanically a single winding but connected in a plurality of circuits and thereby forming electrically two windings of different pole numbers and said field magnet having coils and connections for producing in said magnet a magneto-motive force corresponding in pole number to the greater pole number of the armature, and means for varying the relative strengths of poles of the same polarity in the field magnet to produce therein a second component magneto-motive force corresponding in pole number to the lesser pole number of the armature.

4. A synchronous alternating current machine having a single armature and a single field magnet, said armature having coils forming mechanically a single winding but connected in a plurality of circuits and thereby forming electrically two windings of different pole numbers in the ratio of two to one and said field magnet having coils and connections for producing in said magnet a magneto-motive force corresponding in pole number to the greater pole number of the armature, and means for varying the relative strengths of alternate poles of the same polarity in the field magnet to produce therein a second component magneto-motive force corresponding in pole number to the lesser pole number of the armature.

5. A synchronous alternating current machine having a single armature and a single field magnet, said armature having coils and connections forming electrically two windings of different pole numbers and said field magnet having coils and connections for producing in said magnet simultaneously two component magneto-motive forces corresponding in pole numbers respectively to the two pole numbers of the armature, and means for varying the relative strengths of said magneto-motive forces to vary the relative amounts of the voltages induced in the armature circuits.

6. A synchronous alternating current machine having a single armature and a single field magnet, said armature having coils and connections forming electrically two windings of different pole numbers and said field magnet having coils and connections for producing in said magnet a magneto-motive force corresponding in pole number to the greater pole number of the armature, and means for varying the relative strengths of poles of the same polarity in the field magnet to produce therein a second component magneto-motive force corresponding in pole number to the lesser pole number of the armature.

In witness whereof, I have hereunto set my hand this 4th day of August, 1909.

LAURENCE A. HAWKINS.

Witnesses:
BENJAMIN B. HULL,
MARGARET E. WOOLLEY.